United States Patent [19]

Furtek

[11] Patent Number: 4,654,502
[45] Date of Patent: Mar. 31, 1987

[54] METHOD FOR REFLOW SOLDERING OF SURFACE MOUNTED DEVICES TO PRINTED CIRCUIT BOARDS

[75] Inventor: Edward J. Furtek, Salisbury, Mass.

[73] Assignee: Vitronics Corporation, Newmarket, N.H.

[21] Appl. No.: 776,001

[22] Filed: Sep. 13, 1985

Related U.S. Application Data

[62] Division of Ser. No. 572,163, Jan. 18, 1984, Pat. No. 4,565,917.

[51] Int. Cl.$^4$ .......................... B23K 1/04; B23K 1/19
[52] U.S. Cl. ........................ 219/85 BM; 219/85 BA; 219/85 R; 228/180.1
[58] Field of Search ............. 219/85 R, 85 BA, 85 M, 219/85 E, 85 M; 228/180.1, 43

[56] References Cited

U.S. PATENT DOCUMENTS

| | | | |
|---|---|---|---|
| 3,583,063 | 6/1971 | Growney | 219/85 BM |
| 3,588,425 | 6/1971 | Erickson | 219/85 BA |
| 3,649,803 | 3/1972 | Desmond et al. | 219/85 BA |
| 3,756,489 | 9/1973 | Chartet | 228/43 |
| 4,504,008 | 3/1985 | Kent et al. | 219/85 R X |

OTHER PUBLICATIONS

"Infrared Conveyor Dryer/Oven", Vitronics Corporation Brochure, Jan. 1983.
"Infrared Conveyorized Solder Reflow Systems", Vitronics Corporation Brochure, Jan. 1984.
Crawford, D. J., et al, "Soldering Process for Components on Printed Circuit Cards" IBM Technical Disclosure Bulletin vol. 22, No. 5, Oct. 1979.

Primary Examiner—E. A. Goldberg
Assistant Examiner—Catherine M. Sigda
Attorney, Agent, or Firm—Wolf, Greenfield & Sacks

[57] ABSTRACT

A multi-zone thermal process system utilizing non-focused infrared panel emitters. An insulated housing has a plurality of zones each having separate panel emitters which heat a product load traveling through the zone and in close proximity to said panel(s) at different peak wavelengths in each zone. The panel emitters emit infrared wavelengths in the middle and far regions. The temperature differences across each zone and between the panel and product are held to a minimum. A specific application of the system is for accomplishing reflow soldering of surface mount devices to printed circuit boards.

16 Claims, 6 Drawing Figures

METHOD FOR REFLOW SOLDERING OF SURFACE MOUNTED DEVICES TO PRINTED CIRCUIT BOARDS

This application is a division, of application Ser. No. 572,163, filed Jan. 18, 1984, now U.S. Pat. No. 4,565,917.

FIELD OF THE INVENTION

This invention relates generally to multi-zone thermal process systems utilizing nonfocused infrared panel emitters, and in one embodiment to a method and apparatus for soldering surface mounted devices to printed circuit boards.

BACKGROUND OF THE INVENTION

Rapid advances in the technology of printed circuits and consequent miniaturization have created a growing demand for appropriate mass soldering methods. More components are being concentrated within a printed circuit board than ever before, and due to the increased number of soldered joints and their corresponding close spacing, reliable mass soldering has become increasingly critical.

The conductive method, whereby component assemblies are heated on a "hot plate," is a low-volume, high energy-consuming, difficult to control method of accomplishing solder reflow. The conductive method is ineffective in processing the latest in hybrid assemblies as well as being potentially damaging to temperature-sensitive assemblies.

The convective method involves directing high-velocity heated air at the assembly. This process is slow and energy inefficient, imprecise, and also potentially damaging to heat-sensitive components because, like conductive methods, all the components reach the maximum temperature required to accomplish solder reflow.

Vapor phase, a relatively new method of accomplishing solder reflow, utilizes direct contact condensation heating. The assembly to be heated is immersed in an atmosphere of vapor generated by a pool of boiling fluorocarbonated liquid. The vapor, at the boiling point of the liquid, envelopes the assembly and begins to condense, giving up its latent heat of vaporization and raising the temperature of the assembly to that of the boiling point of the liquid. This causes the solder to melt and reflow.

An advantage of the vapor phase method is temperature control specific to the boiling point of the liquid, such that over-heating is impossible. However, temperatures above 253° C. are unobtainable because fluorocarbonated liquids have not yet been developed capable of boiling at higher temperatures. Furthermore, production is limited to the specific temperature of the liquid, i.e., if one wants to process a product with a solder having a different reflow temperature, the liquid must be drained and new liquid with the required boiling point charged into the system. This results in down time and excess fluid cost. Successful processing of assemblies with more than one solder type or temperature requirement is virtually impossible without processing the assembly more than once through different liquids.

The simple fact that vapor phase heats by pure conduction, i.e., direct contact condensation, is a disadvantage once again because the entire assembly must be heated to the reflow temperature of the solder. Predrying of the solder paste is also necessary or solder spattering can result, and shifting/misalignment of components.

Early infrared conveyer ovens utilized focused tungsten filament lamps to accomplish surface bonding onto ceramic substrates. These types of ovens however were not successful in surface mounting to epoxy/glass or polyimide/glass printed circuit boards.

Focused emitters typically emit short wave infrared radiation in the near or middle infrared regions. The effect of this shortwave emission is twofold. First, the reflective and color-selective nature of these short wavelengths, along with the varied material geometries and thermal conductivities of the components and substrates, causes large $\nabla$ T's between component (differences in temperature) and substrate at reflow point. Large $\nabla$ T's can cause flux charring, charring of polymeric assemblies, and damage to temperature-sensitive components.

Secondly, energy consumption is high. Focused bulb-type emitters operate at temperatures up to 2,700° K. and use up to 1,000 watts each. Some systems use up to 60 bulbs.

A typical furnace utilizing focused infrared lamp emitters consists of a tunnel having a process area approximately 30 inches long and constructed with alumina/silica backup insulation, a firebrick inner shell, and an outer shell of steel. All of the lamps are arranged equidistantly above and below a belt with subsequent lamps being spaced horizontally closer than previous lamps in an attempt to obtain a controllable, sharp temperature rise or spike for optimum reflow conditions at a set belt speed.

SUMMARY OF THE INVENTION

It is a principal object of the invention to provide a multi-zone thermal process system using nonfocused infrared panel emitters.

Another object of the invention is to provide a method and apparatus for soldering surface mounted devices to printed circuit boards utilizing nonfocused infrared radiation panel emitters which emit in the middle and far infrared wavelengths.

Another object of the invention is to accomplish reflow soldering of surface mounted devices to printed circuit boards while maintaining a small $\nabla$ T between the device and the board.

Another object of the invention is to accomplish reflow soldering of surface mounted devices to printed circuit boards using a low energy consumption.

In one aspect, the invention is a multi-zone thermal process apparatus utilizing nonfocused infrared panel emitters. An insulated housing has a plurality of zones each having separate panel emitters which heat a product load traveling through the zone and in close proximity to the panel(s) with infrared radiation of a different peak wavelength to selectively heat different components of the load. The temperature variation across each zone is less than about 0.5° C. and the infrared radiation is in the middle and far infrared regions. The temperature difference between the component being heated and the panel emitting surface is from about 10 to about 20%.

In another aspect, the invention is a method and apparatus for accomplishing reflow soldering of surface mounted devices to printed circuit boards using nonfocused infrared panel emitters whereby the board is subjected to the solder reflow temperature for only a short period of time and the devices never reach the solder reflow temperature, but remain from about 3° to about 10° C. lower in temperature. The board, having devices and solder disposed therein, travels through five zones. In the first zone, panel emitter(s) at a temperature of about 450° C. selectively dry the solder and preheat the board to about 110° C. In the second zone, the flux volatiles are removed and the devices are allowed to catch up with the board temperature. In the third zone, panel emitter(s) at a temperature of about 265° C. selectively heat the board to a temperature of about 150° C. In the fourth zone panel emitters at a temperature of about 220° C. selectively heat the devices up to the board temperature. In the fifth zone, panel emitter(s) at a temperature of about 290° C. heat the board and solder to the solder reflow temperature for a short period of time while the devices remain about 3° to about 10° C. cooler.

Other objects and advantages of the invention will be more fully understood from the accompanying drawings and the following description of several illustrative embodiments and the following claims. It should be understood that terms such as "left," "right," "upper," and "lower" used herein are for convenience of description only, and are not used in any limiting sense.

DETAILED DESCRIPTION OF THE PREFERRED EMBODIMENTS

Figure 1:
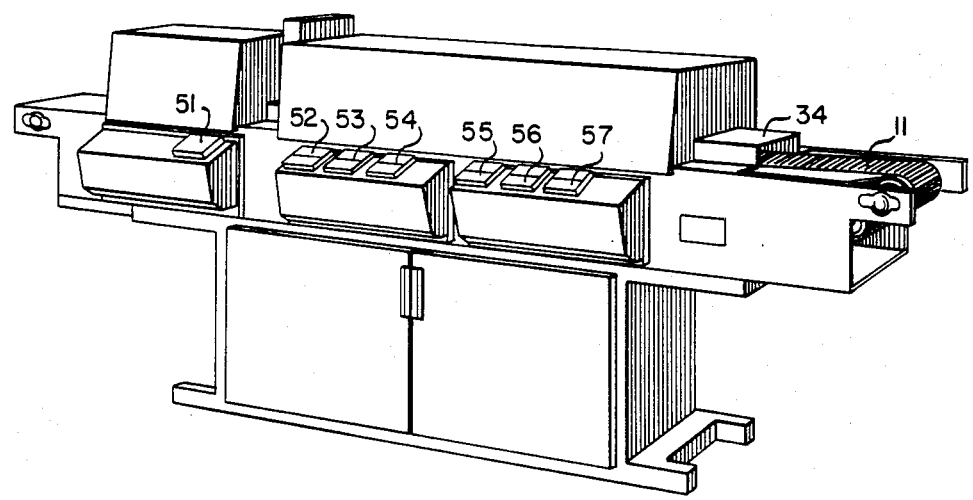
FIG. 1 is a perspective view of the apparatus of the invention.
Figure 2:
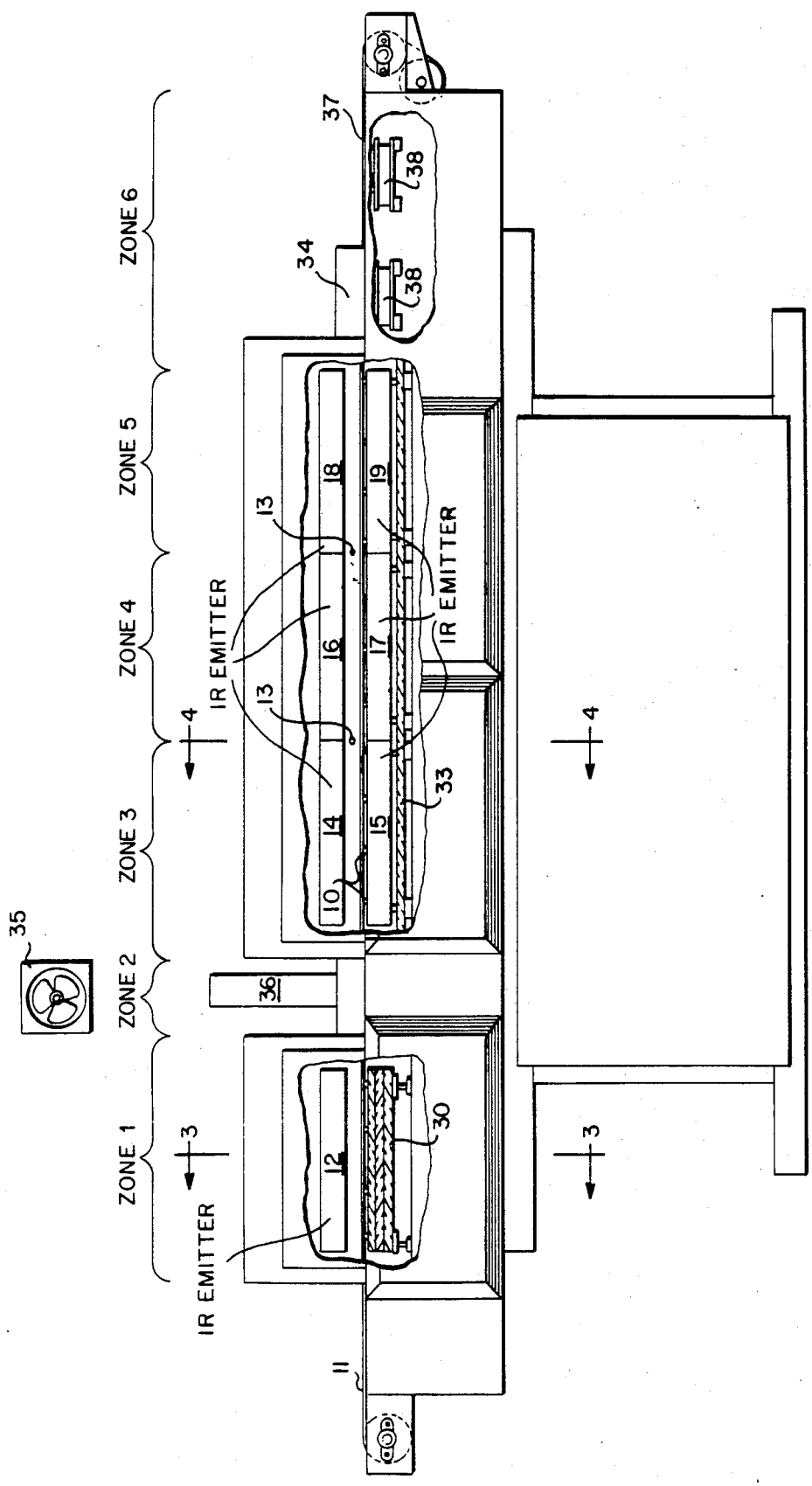
FIG. 2 is a plan and partial sectional view of the apparatus of the invention.

FIGS. 1 and 2 show a conveyorized infrared thermal process system of the invention. The system has along its length a plurality of zones, and is shown for example purposes only as having six zones. A conveyor, such as a belt 11, moves a product load through each of the zones.

Figure 3:
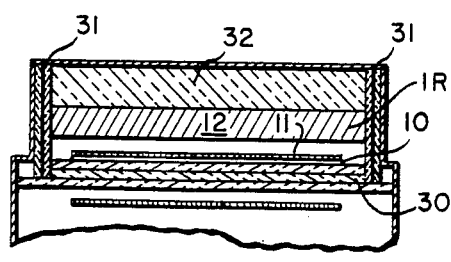
FIG. 3 is a cross-sectional view of zone 1 taken from lines 3—3 of FIG. 2.
Figure 4:
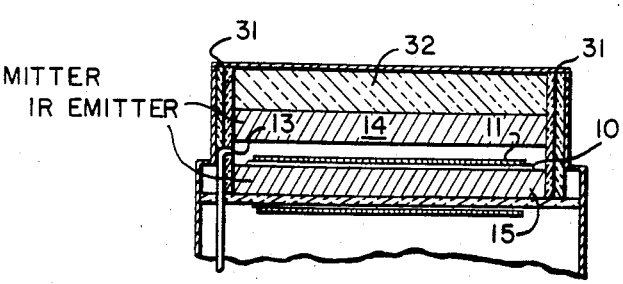
FIG. 4 is a cross-sectional view of zone 3 taken from lines 4—4 of FIG. 2.

Each thermal process zone 1, 3, 4, and 5 utilizes at least one nonfocused infrared panel emitter for transferring radiant energy to the product load as it passes through the zone. Zone 1 has a top panel emitter 12. FIG. 3 is a cross-sectional view of zone 1. Zones 3, 4, and 5 each have a top panel emitter 14, 16, and 18, respectively, and a bottom panel emitter 15, 17, and 19, respectively. FIG. 4 is a cross sectional view of zone 3; zones 4 and 5 are identical in cross section. Each panel emitter is individually microprocessor controlled via direct thermocouple feedback LED controllers 51-57, allowing true zone control, unlimited profileability, and programmable heat spiking characteristics. Special atmospheres can be introduced into zones 3-5 through ports 13.

Insulation surrounds each thermal process zone for maintaining the temperature within the zone. In zone 1, which has no bottom panel emitter, three layers of board insulation 30 may be used to insulate the bottom of the zone (see FIG. 3). A preferred board is 1.5 inch thick "hot board" made of alumina and silica and manufactured by The Carborundum Co., Niagara Falls, N.Y. In zone 3, 4, and 5, each of which have a bottom panel emitter, one layer of board 33 may be used below the bottom panel emitter to insulate the bottom of the zone (see FIG. 4). The sides of zones 1, 3, 4, and 5, as shown in FIGS. 3 and 4, are preferably insulated with two layers of marinite 31, a higher silica content alumina silica board manufactured by 3M Co., St. Paul, Minn. Marinite is a good reflector of infrared radiation. The tops of zones 1, 3, 4, and 5, as shown in FIGS. 3 and 4, are preferably insulated with blanket insulation 32 of spun alumina. Zone 2 may be similarly insulated to protect the product load from the outside environment. Zone 6 has a cover 34 to protect the product load from the environment.

The panel emitters operate on the secondary emission principle. They contain resistive elements which disperse their infrared energy to the surrounding panel materials which radiate infrared energy evenly and uniformly over the entire process area and across a wide spectrum of colors and atomic structures. Every material, depending upon its color and atomic structure, and every object, depending upon its material and physical size, absorbs certain wavelengths of infrared radiation more readily than other wavelengths. Middle and far unfrared is more readily absorbed by a greater number of materials than is the shorter wavelength near infrared radiation.

The advantages of panel emitters are that the infrared emitted is truly nonfocused and does not require special reflectors. Without the unnecessary intensity, special cooling systems are not needed, power consumption is less, and the medium wave infrared emitted boasts the dual properties of penetration and absorption. There are no hot and cold spots in the process area. Further, this system is energy efficient, requiring less power to operate than focused systems.

The noncontact nature of infrared processing has a critical edge over contact-type conductive systems. The sharp temperature rise and inherently rapid nature of infrared processing effectively minimizes the time period during which the product load is exposed to maximum temperature. The broad wavelength emission of the panel emitters allows the operator to vary peak wavelength to accommodate the different absorption characteristics of various materials, as well as varying intensity. In operation, the peak wavelength of infrared radiation in each zone can be precisely controlled to selectively heat desired components of the product load at a greater rate than other components. In this manner, there is more efficient energy transfer to materials of the product load, and greater protection of temperature-sensitive components within the product load.

Figure 5:
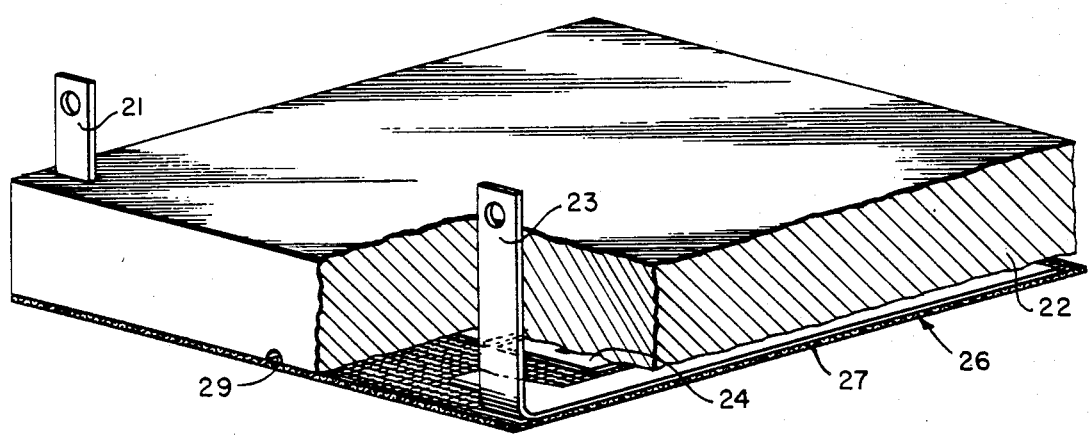
FIG. 5 is a perspective and partial sectional view of a panel emitter.

As shown in FIG. 5, the panel emitters used in the system of the invention have a primary emitter 24 consisting of a flat, coiled, or crimped metal wire or foil (resistive element) positioned between an insulating layer 22 and a secondary emitter 26. Terminals 21 and 23 connect the resistive element to a current source. A preferred primary emitter is an etched foil of Inconel stainless steel having an emissivity factor of 0.9, a thickness of 0.003 inches, and a pattern covering of from about 60 to about 90% of the total foil area. This etched foil is described in commonly assigned U.S. Ser. No. 572,362, now U.S. Pat. No. 4,602,238, which is hereby incorporated by reference.

The insulating layer 22 is made from an electrically-insulating material and reflects infrared radiation to insure efficient emission by the panel in one direction only. A preferred insulating layer is the 1.50 inch thick "hot board" made of alumina and silica manufactured by The Carborundum Co., Niagara Falls, N.Y.

The secondary emitter 26 has an emitting surface 27 and is made from an electrically-insulating, high-emissivity material. Preferred secondary emitter materials include a woven alumina cloth made by 3M Co., St. Paul, Minn., consisting of 98% alumina and 2% organic material, approximately 0.039 inches thick, and having an emissivity factor of 0.9, and an alumina paper made by The Carborundum Co., Niagara Falls, N.Y., having approximately the same composition and thickness. Preferably the above described preferred panel components are bonded together by means of an alumina silica binder. This preferred panel is described in commonly assigned, copending U.S. Ser. No. 572,362, now U.S. Pat. No. 4,602,238. However, other known nonfocused infrared panel emitters may also be used in the systems of this invention.

In operation, the infrared energy emitted by the resistive element heats the secondary emitter material, which in turn emits diffused infrared energy uniformly across its entire emitting surface; hence, the secondary emission principle of operation. A temperature variation of less than 0.5° C. across the panel emitting surface is preferred.

The maximum operating life of these area source emitters is long, up to 8,000 hours, due primarily to the extensive protection afforded the element from oxidation and corrosion. These types of emitters require little or no maintenance and generally outlast all other components in the thermal process system. The panel emitters are nondegrading in intensity throughout their lifetime, and are unaffected by common line voltage variations.

A specific panel emitter having a peak temperature rating of 800° C. has been designed for accomplishing solder attachment of surface mounted devices to printed circuit boards. Applying Wein's displacement law, which states as follows:

$$\lambda(\text{Max. Emission}) = 2897/T \text{ source}$$

(where T is in degrees Kelvin and $\lambda$ is in microns)
it can be determined that at this temperature, the effective peak wavelength of emission would be 2.7 $\mu$. This type of infrared source emits most efficiently in the middle to far infrared range wavelengths.

Temperature sensing and maintenance is achieved via a closed-loop system. A thermocouple sensor rests in a clear quartz well (29 in FIG. 5) approximately 0.093 inches away from the backside of the resistive element and in the center of the panel. The thermocouple is connected to a microprocessor-based PID (proportional integral derivative) controlling device which is programmed to a given panel's operating characteristics. The controller continually compensates around a setpoint for temperature droop and overshoot. It accomplishes this at a constant voltage value by allowing or stopping current flow into the resistive element as necessary via two relays. The controller also compensates for the nonlinear temperature indication characteristics of the type "K" thermocouples used. Thus, indicated temperature corresponds to actual primary emission temperature within ±0.5° C. By controlling the temperature of the primary emitter, the peak wavelength of the infrared radiation emitted by the panel can be controlled, thus controlling the peak wavelength in each respective zone.

The system utilizes a low mass, open mesh, low profile balance weave conveyor belt 11, the characteristics of which are calculated into the system so as not to interfere with emission. The belt may be made of any low carbon stainless steel of about 20 to about 24 gauge and of about 0.187 to about 0.457 inches in height. A preferred belt is made from 22 gauge 314 stainless steel and is 0.187 inches in height.

The belt 11 preferably travels over a series of support rods 10 which extend above the emitting surface of the lower panel emitters 15, 17, and 19. Quartz or stainless steel rods are used to withstand high temperatures. The rods preferably are made of Inconel steel and extend approximately 0.125 inches above the emitting surface. The rods enable the belt to run smoother and eliminate any wear on the surfaces of the lower panel emitters.

It is desirable to minimize the distance between the emitting surface of the panel emitter and the product load for greatest absorption and efficiency. Increasing the distance between the product load and the emitting surface requires an increase in the emitting surface temperature to obtain the same degree of radiation at the product load. Increasing the temperature at the emitting surface requires a shorter wavelength radiation which is more color selective and less readily absorbed. The product load and the emitting surface should be positioned as close as possible but not so close as to allow conductive heating. A preferred range is from about 0.125 to 4 inches with an especially preferred range of about 0.125 to 1 inch.

It has been found that for certain thermal processes a furnace which efficiently emits infrared energy with an appropriate overall energy flux and in the proper absorption ranges of the materials to be processed will result in process optimization. For epoxy/glass, copper, polyimide/glass, and solder, the combined optimal peak absorption of radiant incident infrared energy is in the middle to far infrared wavelengths. In contrast, focused emitters have a peak emission in the near or middle infrared region.

The conveyorized infrared thermal process system of the invention can be utilized to process any product load where it is desired to deliver a clean, noncontact, nonfocused infrared thermal energy uniformly over the entire process area, over a wide range of wavelengths and across a broad spectrum of colors and atomic structures, for a minimal time period at the process temperature, with a more efficient energy transfer to the material, and a greater protection of temperature-sensitive components. Preferred uses include the reflow soldering of surface mounted devices to printed circuit boards, the curing of epoxy resins, reflow soldering of ceramic hybrids, lidsealing, and lead imbedment of semi-conductors.

A preferred embodiment of the invention for reflow soldering of surface mounted devices to printed circuit boards will now be described. The printed circuit boards are typically made of epoxy-glass, such as fire retardant 4(FR-4), or polyimide-glass. These boards typically degrade above temperatures of 225° C. The solder may be, for example, 60/40 (Sn/Pb), 63/37 (Sn/Pb), or 62/36/2 (Sn/Pb/Ag), all of which have a liquidus temperature (i.e., begin to melt) of about 190° C. and a peak reflow temperature of about 210°–218° C.

Thus, to effect reflow soldering without damaging the board, the solder must be allowed to reach a temperature of at least 210° C., but the board cannot reach a temperature of 225° C.

Another important parameter is the difference in temperature ($\nabla T$) between the surface mounted device and the printed circuit board. When processing microelectronic materials, shorter wavelength radiation is inappropriate because the reflective and color selective nature of these wavelengths, along with varied material geometries and thermal conductivities, causes large $\nabla T$'s between component and substrate at reflow points. Large $\nabla T$'s can cause flux charring, charring of polymeric assemblies, and damage to temperature sensitive components. The variety of materials used today in microelectronics are most successfully processed in a variety of middle infrared wavelengths. Use of these wavelengths nets small $\nabla T$'s between component and substrate. Using the method and apparatus of this invention, the component, regardless of geometry or color, has been found to be at least 3° C. to 10° C. cooler than the substrate at reflow point. Also, in serrated ceramic chip carrier assemblies, dye has been found to "see" a minimum of 10° C. less than the carrier peak temperature.

As shown in FIG. 2, the board having devices and solder disposed thereon (i.e., the assembly) is placed on belt 11 and sent through a first zone 1 to drive off specific flux volatiles in the solder paste in order to minimize solder balling during reflow. The emitting surface of panel emitter 12 is at a temperature of approximately 450° C., which corresponds to a peak infrared wavelength of approximately 3.5 $\mu$ in zone 1. The belt speed is set to enable the board to spend approximately 60 seconds in this preheat zone which enables the board to reach a first board temperature of approximately 110° C. when it exists the zone.

The board then travels through a second zone 2 comprising a vented transition area where the flux volatiles (e.g., alcohol) are removed so as not to be present at reflow and the components are brought up to approximately the first board temperature. A fan 35 is positioned over a vent 36 to maintain a slight draft. Air enters at both ends of the apparatus and exits through the vent. The assembly spends approximately 45 seconds in the transition zone, and the temperature of the board and devices at exit is approximately 105° C.

The board is then sent into a third zone 3 where the temperature of the emitting surfaces of top and bottom panel emitters 14 and 15 is approximately 265° C., corresponding to a peak infrared wavelength of approximately 3.8 $\mu$ for zone 3. Since the board and surrounding furnace insulation are now emitting radiation, the exact wavelength for the resistance element is difficult to ascertain. The assembly spends approximately 60 seconds in the third zone and the board is brought up to a second board temperature of approximately 150° C. at exit.

The board is then sent into a fourth zone 4 to enable the devices to catch up with the second board temperature. The emitting surfaces of the top and bottom panel emitters 16 and 17 are at approximately 220° C., which corresponds to a peak infrared wavelength of approximately 4 microns for zone 4. The assembly spends approximately 60 seconds in the fourth zone and the temperature of the board and devices at exit is approximately 150° C.

The board is then sent into a fifth zone 5 to bring the temperature of the board up to a temperature of approximately 210° C., the devices up to approximately 195° C., and the solder up to approximately 210° C. for a period of time of from about 10 to about 20 seconds to cause the solder to flow. Because the devices are cooler than the board, the solder flows up the devices. The emitting surfaces of top and bottom panel emitters 18 and 19 are at approximately 290° C. which corresponds to a peak infrared wavelength of approximately 3.9$\mu$ in the fifth zone. The board spends approximately 60 seconds in the fifth zone, but only about 10 to 20 seconds at 210° C. Thus, the board is at the solder reflow temperature for only a short period of time and the devices never reach the solder reflow temperature.

The board is then sent into a zone 6 where a "protected" temperature reduction is accomplished partly under cover 34 via a heat sinking plate 37 under belt 11 and air directed by fans 38.

The belt width may range from 6 to 22 inches, and the maximum temperature variation across the process area is $\pm 1°$ C. to $\pm 2.5°$ C., respectively. An accurate and repeatable conveyor speed is maintained via a closed loop, self-compensating D.C. controlled circuit. The belt wire used was 22 gauge 314 stainless steel, and the total belt thickness was 0.187 inch.

A preferred belt speed is between 10.5 and 12 inches per minute. This enables the board to spend the above designated time in each zone if zones 1, 3, 4, and 5 are each approximately 12 inches in length, and zone 2 is approximately 8 inches in length. All of the panel emitters were 18 inches in width.

The distance between the emitting surface and the product load should be less than about 3 inches. The distance between the top and bottom emitting surfaces in the preferred embodiment described was 1.5 inches.

Actual production testing with this furnace design has shown that optimal flux densities and proper absorption matching of materials has in fact been attained. There is more than adequate soldered joint strength, minimal to zero warping of board material, and no delamination whatsoever. Furthermore, no damage to temperature-sensitive components has been found. This is because the board and the solder rise in temperature at essentially equal rates, while the surface mounted components rarely attain maximum board/solder temperature.

Figure 6:
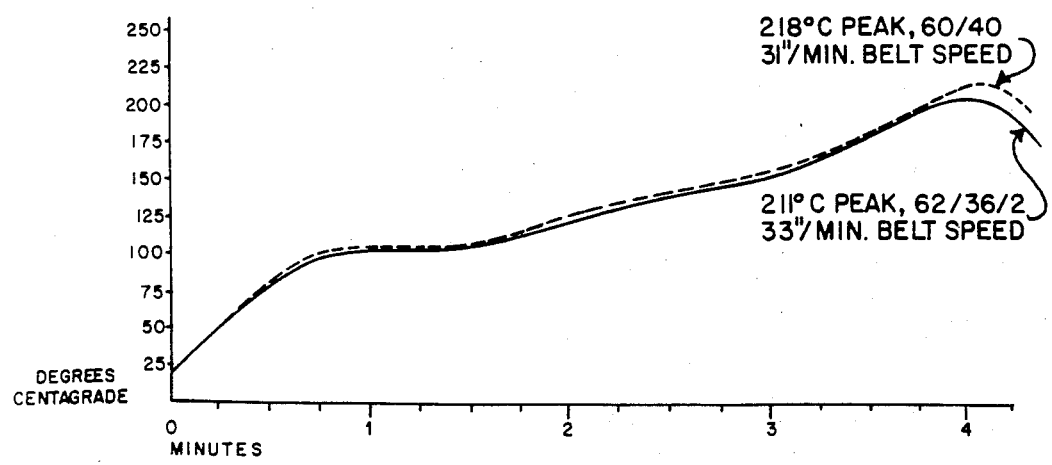
FIG. 6 is a graph of temperature profiles for solder reflow.

Furnace and actual profile parameters were obtained by embedding a type "K" thermocouple in the surface of a 3×5 inch FR-4, 0.052 inch thick, multilayer printed circuit board with half of the intended component mass and sending it through the surface on a conveyor. This procedure yielded optimum soldered flow profiles for 62/36/2 (Sn/Pb/Ag) and 60/40 (Sn/Pb). FIG. 6 shows these profiles. The pre-heat zone 1 emission was at 3.95 $\mu$ peak wavelength and the process zone (3–5) emissions ranged from peak wavelengths of 6.12 to 5.05 microns.

Additional tests indicated that processing interlayer boards of identical thickness but with larger surface areas did not measurably affect their actual temperature profiles within the acquired furnace profiles (8×10 inch to 10×16 inch, 0.052 inch thick multilayers). Decreasing total board thickness or switching to boards with no interlayers necessitated minor decreases in emitter temperatures to maintain the optimum conditions shown above.

These latter two observations are important in that they indicate a minimum of parameter changes necessary to process a wide range of printed circuit boards/surface mount assemblies. Additionally, single pass, double-sided surface mounting with matching solder types was accomplished on an identical 3×5 inch, 0.052 inch thick board as was used initially for developing profiles as well as solder attachment of surface mounts to single-sided polyimide/glass boards.

It has been found that careful consideration of thermal system design and emitter output with respect to product incident infrared absorption ranges and heat capacity insures optimal processing and results for surface mounting to printed circuit board materials. Epoxy/glass (FR-4), polyimide/glass, copper, and solder show the best combined incident infrared absorption in the middle to far infrared wavelengths. Panel emitter infrared furnaces developed for surface mounting to printed circuit boards emit these appropriate wavelengths most efficiently and at appropriate flux densities, and they can process these materials reliably with no deleterious effects.

I claim:

1. A method for reflow soldering of surface mounted devices to a printed circuit board comprising:
    moving a printed circuit board having solder and devices disposed on a surface thereof through a first zone and in close proximity to a first emitting surface of at least one nonfocused infrared panel emitter, said first emitting surface being at a first panel temperature;
    moving said board through a second zone and in close proximity to a second emitting surface of at least one nonfocused infrared panel emitter, said second emitting surface being at a second panel temperature lower than said first panel temperature; and
    moving said board through a third zone and in close proximity to a third emitting surface of at least one nonfocused infrared panel emitter, said third emitting surface being at a third panel temperature higher than said second panel temperature, said third emitting surface heating said board and said solder to a solder reflow temperature for a period of time sufficient to cause said solder to reflow and solder said devices to said board while maintaining the temperature of said devices below said solder reflow temperature.

2. The method of claim 1 wherein said close prximity is a distance of from about 0.125 to about 4 inches.

3. The method of claim 1 wherein said temperature of said devices in said third zone is from about 3° to about 10° C. less than said solder reflow temperature.

4. The method of claim 1 wherein the temperature difference between each of said second and third emitting surfaces and each of said board, said devices and said solder, when said board is exiting each of said respective second and third zones is from about 10% to about 50%.

5. The method of claim 1 wherein each of said panel emitters emits infrared radiation.

6. The method of claim 1 further comprising the initial step of moving said board through a preheat zone and in close proximity to a fourth emitting surface of at least one nonfocused infrared panel emitter, said fourth emitting surface being at a preheat temperature for drying said solder and maintaining said board and said devices at a temperature below said first board temperature.

7. The method of claim 6 further comprising, after said step of moving said board through a preheat zone, the step of moving said board through a transition zone for removing volatiles generated by said drying of said solder and for allowing the temperature of said devices to rise to about the same temperature as said board.

8. A method for reflow soldering of surface mounted devices to a printed circuit board comprising:
    moving a printed circuit board having solder and devices disposed on a surface thereof through a first zone and at a distance of less than about 4 inches from a first emitting surface of at least one nonfocussed infrared panel emitter having a first emitting surface temperature of approximately 450° C. for a period of time sufficient for said board to reach a first board temperature of approximately 110° C.;
    moving said board through a second zone for a period of time sufficient for the temperature of said devices to rise to about the temperature of said board;
    moving said board through a third zone and less than about 4 inches from a third emitting surface of at least one nonfocused infrared panel emitter having a third emitting surface temperature of approximately 265° C. for a period of time sufficient for said board to reach a second board temperature of approximately 150° C.;
    moving said board through a fourth zone and less than about 4 inches from a fourth emitting surface of at least one nonfocused infrared panel emitter having a fourth emitting surface temperature of approximately 220° C. for a period of time sufficient for the temperature of said devices to rise to about the temperature of said board; and
    moving said board through a fifth zone and less than about 4 inches from a fifth emitting surface of at least one nonfocused infrared panel emitter having a fifth emitting surface temperature of approximately 290° C. to enable said board to reach a third board temperature of approximately 210° C., said devices to reach a temperature of approximately 195° C., and said solder to reach a temperature of at least about 210° C. to cause said solder to reflow.

9. The method of claim 8 wherein said moving through said first zone takes approximately 60 seconds; said moving through said second zone takes approximately 45 seconds; said moving through said third zone takes approximately sixty seconds; said moving through said fourth zone takes approximately 60 seconds; and said moving through said fifth zone takes approximately 60 seconds.

10. The method of claim 8 further comprising after moving through said fifth zone the step of moving said board through a sixth zone for cooling said board.

11. The method of claim 8 wherein said distance between said board and each of said emitting surfaces is approximately 1.5 inches.

12. The method of claim 8 wherein said third, fourth, and fifth zones each have a top and a bottom panel emitter.

13. A method for reflow soldering of surface mounted devices to a printed circuit board comprising:
    moving a printed circuit board having solder and devices disposed on a surface thereof through a first zone in close proximity to a first emitting surface of a first nonfocused infrared panel emitter, said first emitter surface being at a preheat temperature for drying said solder;

moving said board through a vented transition zone for permitting the temperature of the devices to rise to about the temperature of the board;

moving said board through a second zone in close proximity to a second emitting surface of a second nonfocused infrared panel emitter, said second emitting surface being at a second temperature lower than said preheat temperature; and moving said board through a third zone in close proximity to a third emitting surface of a third nonfocused infrared panel emitter, said third emitting surface heating said board and said solder to a solder reflow temperature for a period of time sufficient to cause said solder to reflow while maintaining the temperature of said devices below the solder reflow temperature.

14. The method of claim 13 wherein said steps of moving said board through the second zone and moving said board through the third zone, each comprise the step of moving said board between two spaced, confronting, nonfocused infrared panel emitters.

15. A method for reflow soldering of surface mounted devices to a printed circuit board comprising:
moving a printed circuit board having solder and devices disposed on a surface thereof through a first zone for a period of time of approximately 60 seconds at a distance of less than about 4 inches from a first emitting surface of a first nonfocused infrared panel emitter, said first emitting surface having a temperature of approximately 450° C.;

moving said board through a second, vented zone for a period of time of approximately 45 seconds;

moving said board through a third zone for a period of time of approximately 60 seconds at a distance of less than about 4 inches from a third emitting surface of a third nonfocused infrared panel emitter, said third emitting surface having a temperature of approximately 265° C.;

moving said board through a fourth zone for a period o time of approximately 60 seconds at a distance of less than about 4 inches from a fourth emitting surface of a fourth nonfocused infrared panel emitter, said fourth emitting surface having a temperature of approximately 220° C.;

moving said board through a fifth zone for a period of time of approximately 60 seconds at a distance of less than about 4 inches from a fifth emitting surface of a fifth nonfocused infrared panel emitter, said fifth emitting surface having a temperature of approximateemitting surface of a fifth nonfocused infrared panel emitter, said fifth emitting surface having a temperature of approximately 290° C.; and cooling said board and said devices disposed thereon.

16. A method for reflow soldering of surface mounted devices to a printed circuit board comprising:
moving a printed circuit board having solder and devices disposed on a surface thereof through a first zone in close proximity to a first emitting surface of a first nonfocused infrared panel emitter;

controlling the temperature of said first emitting surface and the time during which the board resides in the first zone to heat the board to a first board temperature below the reflow temperature of the solder and to maintain the devices at a temperature below the first board temperature;

moving the board through a second zone in close proximity to a second emitting surface of a second nonfocused infrared panel emitter;

controlling the temperature of the second emitting surface and the time during which the board resides in the second zone to allow the temperature of the devices to rise to about the temperature of the board;

moving the board through a third zone in close proximity to a third emitting surface of a third nonfocused infrared panel emitter; and controlling the temperature of the third emitting surface and the time during which the board resides in the third zone to heat the board and the solder to the reflow temperature of the solder to cause the solder to reflow while maintaining the temperature of the devices below the reflow temperature of the solder.

* * * * *

REEXAMINATION CERTIFICATE (3953rd)

United States Patent [19]
Furtek

[11] B1 4,654,502
[45] Certificate Issued Dec. 14, 1999

[54] METHOD FOR REFLOW SOLDERING OF SURFACE MOUNTED DEVICES TO PRINTED CIRCUIT BOARDS

[75] Inventor: Edward J. Furtek, Salisbury, Mass.

[73] Assignee: Vitronics Corporation, Newmarket, N.H.

Reexamination Request:
No. 90/004,257, May 30, 1996

Reexamination Certificate for:
Patent No.: 4,654,502
Issued: Mar. 31, 1987
Appl. No.: 06/776,001
Filed: Sep. 13, 1985

Related U.S. Application Data

[62] Division of application No. 06/572,163, Jan. 18, 1984, Pat. No. 4,565,917.

[51] Int. Cl.[6] .............................. B23K 1/04; B23K 1/19; B23K 31/02; F27B 9/36

[52] U.S. Cl. ................. 219/85.13; 219/85.1; 219/85.12; 219/388; 228/234.2; 228/180.1

[58] Field of Search ............................................. 219/388

[56] References Cited

PUBLICATIONS

Vitronics Model 1336 Solder Reflow Systems Brochure.
Vitronics IR Source Newsletter.
*Circuits Manufacturing* Article entitled "IR Furnace Systems solder fusing and other applications", dated Aug. 1981.
Intex International, Inc. "J" Series Machines Brochure, dated Jan. 1983.
Radiant Technology Corporation Brochure entitled "Infrared Furnaces", dated Apr. 1981.
Tempress Brochure entitled "Model 830 electronic packaging conveyor furnaces", dated 1980.
"Rapid Reflow–soldering Constraints and Conveyor Furnace Design", Electronic Packaging and Production, pp. 58–65, Jan. 1972.

*Primary Examiner*—Joseph Pelham

[57] ABSTRACT

A multi-zone thermal process system utilizing nonfocused infrared panel emitters. An insulated housing has a plurality of zones each having separate panel emitters which heat a product load traveling through the zone and in close proximity to said panel(s) at different peak wavelengths in each zone. The panel emitters emit infrared wavelengths in the middle and far regions. The temperature differences across each zone and between the panel and product are held to a minimum. A specific application of the system is for accomplishing reflow soldering of surface mount devices to printed circuit boards.

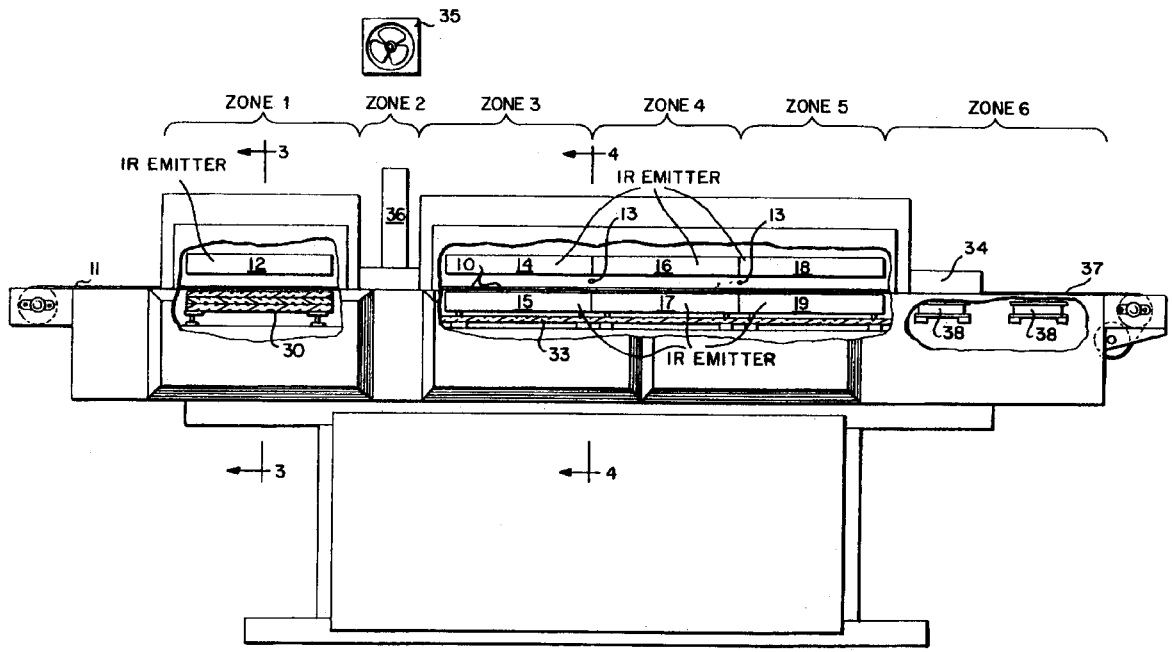

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6–15 is confirmed.

Claims 1–5 and 16 are cancelled.

\* \* \* \* \*